United States Patent [19]

Sextro et al.

[11] 4,045,415

[45] Aug. 30, 1977

[54] PROCESS FOR PREPARING COPOLYMERS OF TRIOXANE

[75] Inventors: Günter Sextro, Naurod; Karlheinz Burg, Langenhain, Taunus; Klemens Gütweiler, Oberjosbach; Klaus Dürichen, Munich, all of Germany

[73] Assignee: Hoechst Aktiengesellschaft, Frankfurt (Main), Germany

[21] Appl. No.: 587,839

[22] Filed: June 18, 1975

Related U.S. Application Data

[63] Continuation-in-part of Ser. No. 427,251, Dec. 21, 1973, abandoned, and a continuation-in-part of Ser. No. 427,254, Dec. 21, 1973, abandoned.

[30] Foreign Application Priority Data

Dec. 14, 1973  Germany ............................ 2362172

[51] Int. Cl.² .......................... C08G 2/10; C08F 6/00; C08F 3/00
[52] U.S. Cl. ................................ 260/67 FP; 526/914
[58] Field of Search ................................... 260/67 FP

[56] References Cited

U.S. PATENT DOCUMENTS

| 3,442,862 | 5/1969 | Flodin et al. ..................... 260/67 FP |
| 3,513,128 | 5/1970 | Herrmann et al. ............... 260/67 FP |
| 3,590,110 | 6/1971 | Decitre ............................... 264/212 |

*Primary Examiner*—Lucille M. Phynes
*Attorney, Agent, or Firm*—Curtis, Morris & Safford

[57] ABSTRACT

Copolymers of trioxane with cyclic acetals may be prepared by copolymerization of the monomers in solid phase. For this purpose the monomers are first mixed homogeneously in a liquid phase with a catalyst, the mixture is then solidified by cooling and finally polymerized by heating, while maintaining it in a solid phase. The liquid phase mixture is cooled to solidify it immediately after mixing and prior to development of turbidity in the liquid mixture. Cooling can be effected, for example, on a chilled rotating roll. The moulding composition, obtained after having worked up the copolymer as usual, is a suitable material for the preparation of molded semi-finished products and finished articles.

10 Claims, 2 Drawing Figures

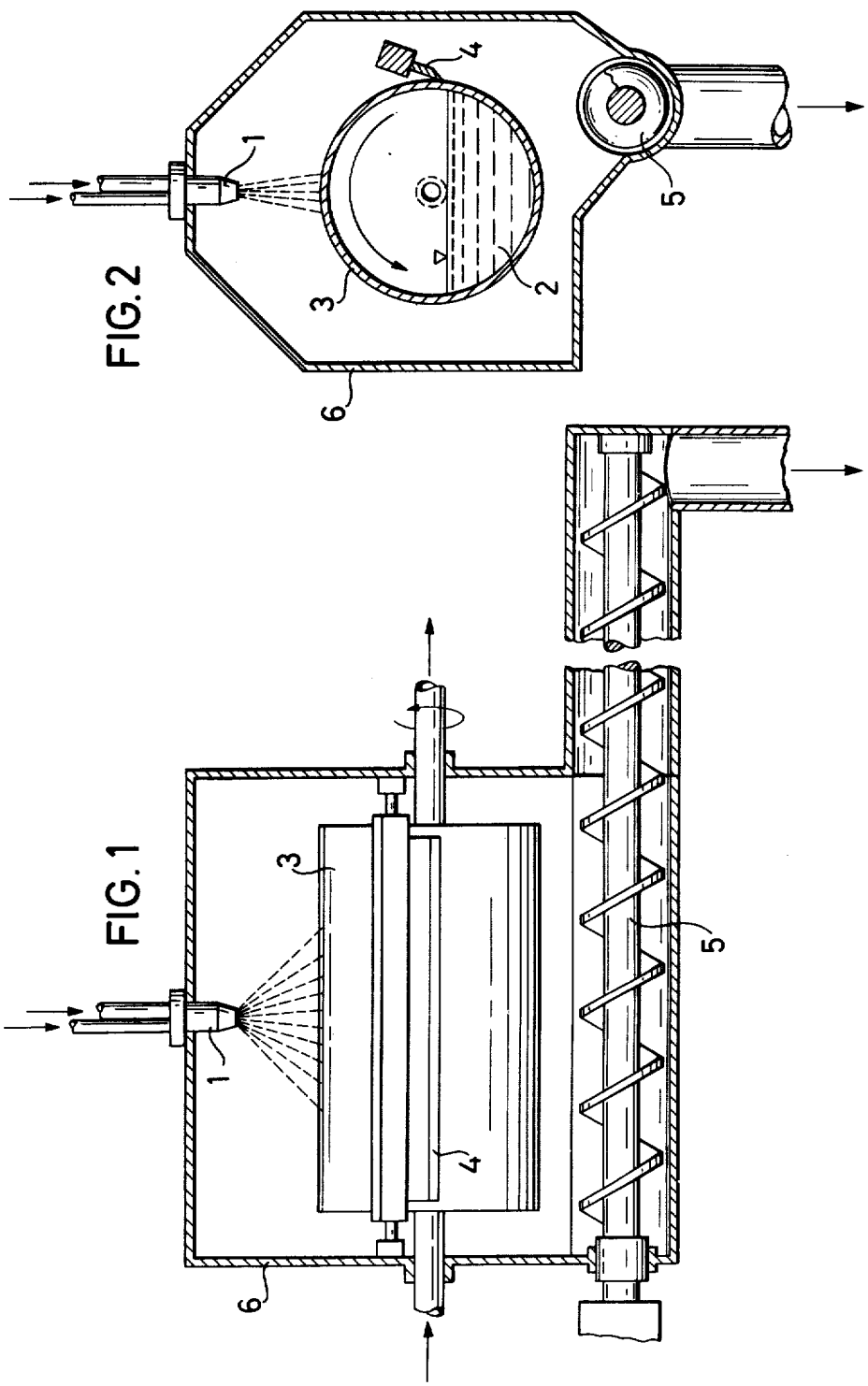

PROCESS FOR PREPARING COPOLYMERS OF TRIOXANE

This application is a continuation-in-part of applications Ser. Nos. 427,251 and 427,254 both filed on Dec. 21, 1973 and now abandoned.

It is well known that thermoplastically processible polymers with excellent thermal stability and valuable mechanical properties may be obtained by copolymerization of trioxane with certain cyclic ethers or cyclic acetals and, optionally, by subsequent elimination of unstable portions (cf. for example German Auslegeschriften Nos. 1,420,283 and 1,445,273).

It is further known that copolymers with elevated molecular weights and improved fluidity may be obtained by keeping homogeneous liquid mixtures of trioxane, comonomers or prepolymers and cationically active catalysts at temperatures above the melting point of these mixtures, by cooling same rapidly upon the first signs of turbidity to temperatures below the melting point and, optionally, by repeating the heating and cooling operations (cf. German Auslegeschrift No. 1,495,718 and German Offenlegungsschrift No. 1,595,435).

It is also known that homogeneous mixtures of molten trioxane and catalyst can be solidified by rapid cooling prior to polymerization and the polymerization performed subsequently by tempering at temperatures between 25° and 62° C in the solid state (cf. German Auslegeschrift No. 1,595,507).

However, the above-described processes for copolymerizing trioxane present several disadvantages. One of them is the fact that a loss of weight occurs during the polymerization reaction, due to the escape of gaseous monomers and formaldehyde. Usually, these losses are unavoidable if temperatures of more than about 80° to 90° C, especially of more than 100° C are used during exothermic polymerization phase. The monomer losses may amount to up to about 20 wt. %.

In the copolymerization according to German Auslegeschrift No. 1,495,718 an essential requirement is the existence of prepolymers: Either a mixture of trioxane, comonomer and catalyst is maintained at a temperature above its melting point up to the first sign of turbidity, this turbidity indicating the end of the prepolymerization period and the beginning of the genuine polymerization, or a prepolymer is used which had been prepared in a separate processing step. Only after having established this condition, may the batch be cooled; otherwise the yields are very low. A further inconvenience of the afore described process is the necessity to repeat the phase transition from solid to liquid several times in order to get optimum yields.

The process according to German Offenlegungsschrift No. 1,595,435 requires also as an essential prerequisite the formation of prepolymers, for the mixture of trioxane, comonomers and catalyst, being first a liquid, has to be chilled after turbidity develops. From this moment on the polymers are built up, which means that the genuine polymerization starts at this time. This process presents the inconvenience that the end of the incubation time, which is indicated by the initial turbidity of the polymer mixture, has to be determined exactly so as to avoid the exothermic polymerization reaction which very often occurs quite rapidly if no immediate cooling is applied. Furthermore, this process can be used only in devices made of transparent material, since otherwise the point of turbidity is undiscernable.

According to the process described in German Auslegeschrift No. 1,595,507 a homopolymerization of trioxane is performed in solid phase. This processing method is inconvenient because it requires polymerization periods of several hours and, besides, the yields obtained are poor.

One embodiment of the present invention is a process for preparing copolymers of trioxane by polymerization of 99.9 to 90 weight percent of trioxane and 0.1 to 10 wt % of a cyclic acetal in the presence of a cationically active catalyst, which comprises rapid and homogeneous mixing of trioxane, cyclic acetal and catalyst at a temperature from 62° to 115° C, solidifying by chilling e.g. on a cooled roll the thus produced liquid mixture immediately and prior to the mixture becoming turbid, then heating the mixture to a temperature of about 62° to 130° while it is maintained in a solid state and finally working-up as usual.

Another embodiment of the present invention is a molding composition on the basis of poly(oxymethylene), consisting essentially of a copolymer which is prepared by polymerization of 99.9 to 90 wt. % of trioxane and 0.1 to 10 wt. % of a cyclic acetal in the presence of a cationically active catalyst by rapidly and homogeneously mixing at a temperature from 62° to 115° C trioxane, cyclic acetal and catalyst and subsequently solidifying the thus produced liquid mixture by chilling, e.g. on a cooled roll, immediately and prior to the mixture becoming turbid, heating the mixture to a temperature of about 62° to 130° while it is maintained in a solid state and finally working it up as usual.

For practical reasons, the process according to the invention is performed with purified trioxane; usually the purification is carried out by distillation or by crystallization. The degree of purity of trioxane should be at least 99.5%, preferably at least 99.9%; the contents of water and/or formic acid should be below 100 ppm, preferably below 50 ppm and the trioxane should be practically free of basic substances such as amines.

The process of the invention uses as cyclic acetals especially cyclic formals other than trioxane and having from 5 to 11, preferably from 5 to 8, ring members. Particularly suitable are cyclic formals of α,ω-diols having from 2 to 8 preferably from 2 to 4 carbon atoms, the carbon chain of which may be interrupted by an oxygen atom at intervals of at least 2 carbon atoms. Preference is given to the use of cyclic formals having the formula

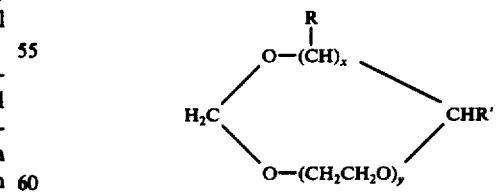

wherein R and R' may be the same or different and each represents a hydrogen atom, a phenyl radical or an aliphatic alkyl radical having from 1 to 5, preferably 1 to 3 carbon atoms, and $x$ is an integer from 1 to 7, preferably from 1 to 5, and $y$ is zero, or $x$ is 1 and $y$ is 1 to 3. As examples of cyclic acetals there may be cited 1,3-dioxolane, 1,3-dioxane, 1,3-dioxepane, 1,3-dioxocane, 1,3-dioxonane, 1,3,6-trioxocane, 4-methyl-1,3-dioxolane and 4 phenyl-1,3-dioxolane.

The quality of trioxane used amounts generally to from 99.9 to 90 wt. %, preferably from 99.5 to 95 wt. %, whilst the cyclic acetal is used in a quantity of from 0.1 to 10 wt. %, preferably from 0.5 to 5 wt. %. Particularly preferred mixtures are those containing from 99 to 97 wt. % of trioxane and from 1 to 3 wt. % of a cyclic acetal.

For the preparation of polymers with determined ranges of molecular weight it is useful to perform the polymerization in the presence of a regulator. Most suitable for this purpose are formaldehyde-dialkylacetals having from 3 to 9, preferably from 3 to 5 carbon atoms, for example formaldehyde-dimethylacetal, -diethylacetal, -dipropylacetal and -dibutylacetal, as well as lower aliphatic alcohols, preferably alkanols having from 1 to 4 carbon atoms, e.g. methanol, ethanol, propanol and butanol. The regulator is usually applied in a quantity of up to 1 wt. %, preferably from 0.05 to 0.5 wt. %, calculated on the total quantity of the monomers.

As cationically active catalysts are used (1) protonic acids such as perchloric acid, (2) esters of protonic acids, especially esters of perchloric acid with lower aliphatic alcohols, for example perchloric acid-tert.butylester, (3) anhydrides of protonic acids, especially mixed anhydrides of perchloric acid and a lower aliphatic carboxylic acid, e.g. acetyl perchlorate, (4) Lewis acids, especially halides of boron, tin, titanium, phosphorous, arsenic and antimony, for example boron trifluoride, tin tetrachloride, titanium tetrachloride, phosphorous pentachloride, phosphorous pentafluoride, arsenic pentafluoride and antimony pentafluoride, and (5) complex or salt-like compounds, preferably etherates or onium salts of Lewis acids, for example boron trifluoride-diethyl etherate, boron trifluoride-di-n-butyl etherate, triethyloxonium-tetrafluoroborate, trimethyloxonium hexafluorophosphate, triphenylmethylhexafluoroarsenate, acetyl tetrafluoroborate, acetyl hexafluorophosphate and acetyl hexafluoroarsenate.

The quantity of the catalysts used in the process according to the invention depends mainly on their efficiency; the catalysts are generally used in a quantity by weight of from 0.1 to 2,000, preferably from 0.2 to 500 ppm, calculated on the total quantity of the monomers to be polymerized. Catalysts having a good efficiency such as boron trifluoride show the best effect when applied in a quantity by weight of from 10 to 150, preferably from 20 to 100 ppm, calculated on the total quantity of the monomers to be polymerized. As far as complex or salt-like compounds are concerned, they are used in the corresponding molar quantities. Catalysts of extraordinary efficiency such as perchloric acid are used at the rate of from 0.2 to 10, preferably from 0.3 to 5 ppm. The most favorable quantity of a catalyst may be easily determined for each specific case by a few preliminary tests; the quantity is correct when the polymerization mixture can be fully solidified by chilling prior to becoming turbid and when this same mixture is polymerizable in solid phase while being heated to polymerization temperature.

Generally, it is desirable to use the catalysts in diluted form. Gaseous catalysts are diluted with an inert gas, for example nitrogen and rare gases such as argon, while liquid or solid catalysts are dissolved in an inert solvent. Suitable solvents are especially aliphatic or cycloaliphatic hydrocarbons, halogenated aliphatic hydrocarbons as well as nitrated aliphatic or aromatic hydrocarbons. As examples there may be cited cyclohexane, methylene chloride, ethylene chloride, nitromethane and nitrobenzene. The weight proportion of catalyst to diluent usually amounts to 1:5 to 1:10,000, preferably from 1:10 to 1:100. Very efficient catalysts are diluted with the best effect in proportions of from 1:5,000 to 1:20,000.

Best results are obtained when performing the polymerization process according to the invention under an inert gas atmosphere and while strictly excluding any humidity; suitable inert gases are, for example, nitrogen and rare gases such as argon.

The monomers and the catalyst should be mixed as fast and as homogeneously as possible, which means at most within 5 seconds, preferably within 2 seconds. The mixing process is performed at a temperature above the melting point and below the boiling point of the monomer mixture, i.e. at a temperature of from about 62° to 115° C, preferably from 62° to 80° C.

Cooling and solidifying of the liquid polymerization mixture should also be performed as fast as possible. The cooling time may vary depending on the kind and quantity of the catalyst as well as on kind, purity and quantity of the monomers. It is desirably from 0.1 seconds to 3 minutes, preferably from 1 to 60 seconds, and most preferably from 1 to 15 seconds. For solidification of the liquid polymerization mixture cooling to a temperature below the melting point of the mixture suffices. But it is advantageous to chill the mixture to a temperature of from +40° to −20° C, preferably from +20° to 0° C.

Rapid cooling of the liquid polymerization mixture can be achieved for example, by an intimate contact of the melt with cooled surfaces, e.g. cooled hoses, plates, ribbons or in vessels. For practical reasons, the layer of the mixture should not exceed a thickness of several centimeters; particularly good results are obtained with layers having a thickness from 0.1 to 20 mm, preferably from 1 to 10 mm. The mixture can be cooled in chilled extruders or kneaders as well. The important point is that the cooling effect must be sufficient to cool and solidify the liquid polymerization mixture within the time interval between addition of the catalyst and the first sign of turbidity. Subsequently the solidified mixture is polymerized at a temperature of from 62° to 130° C, preferably from 70° to 100° C without melting. Heating and cooling repeatedly has no influence on the yield and the properties of the product.

The process of the invention may be conveniently carried out in apparatus comprising a rotating cooled roll, a dosing device above the roll, scraping means associated with the roll and heat transfer means below the roll.

A device suitable for carrying out the process of the invention will now be described with reference to the accompanying drawing in which:

FIG. 1 is a front view of the cooling roll and conveyor and

FIG. 2 is a cross sectional view thereof.

In FIG. 1, the dosing equipment 1 is preferably a mixing nozzle, for example a one-component nozzle, through which the mixture of monomers and catalyst is sprayed onto roll 3 cooled by a cooling liquid 2. It is preferred to use a nozzle with a slit-like outlet parallel to the axis of the roll and positioned above the top generator of the roll as shown in the drawing. With large rolls a plurality of nozzles can be arranged side by side in a comblike arrangement. The scraping means 4 is preferably a knife located in such a position that the mixture of monomers and catalyst solidified on the roll is scraped off after the roll has turned about 180° to 270°. The transporting means 5 below the roll is preferably a screw conveyor or a paddle screw. The device is surrounded by a casing 6. In FIG. 2 the corresponding elements of the device are designated by the same numerals.

The speed of rotation of the cooled roll is adjusted in such a manner that before the polymerization mixture reaches the scraping means it has completely solidified and that the layer formed on the roll is easy to take off. In general, the speed of rotation is from 1 to 20, preferably from 3 to 10 revolutions per minute, the layer thickness being from 0.3 to 5 mm, preferably 0.5 to 3 mm.

The solidified mixture scraped off the roll falls into the transporting means wherein it is polymerized without melting at a temperature of from 62° to 130° C, preferably 80° to 120° C. To complete the polymerization the mixture may subsequently be transferred into a series connected polymerization apparatus, for example a heatable conveyor belt, a paddle drier, a kneader, or an extruder, advantageously a double screw extruder. The residence time of the polymerization mixture in the transporting means and optionally the polymerization apparatus is from 1 to 30, preferably 5 to 15 minutes altogether, depending on the temperature and amount of catalyst.

To avoid the formation of deposits on the inner wall of the casing around the cooling roll and the transporting means the casing should be kept at a temperature of about 100° to 130°, preferably 120° to 130° C.

To eliminate unstable portions, the copolymers are submitted to a thermal or hydrolytical, controlled, partial degradation process down to primary alcohol terminal groups (cf. for example German Auslegeschriften Nos. 1,445,273 and 1,445,294). The degradation is performed preferably under an atmosphere of an inert gas.

To prepare the molding composition according to the invention, the copolymers of trioxane, preferably in the presence of stabilizers against the action of heat, oxygen and light, are homogenized in the melt. This process is performed preferably in an extruder at a temperature above the melting point of the polymer up to 250° C, preferably of from 180° to 210° C.

Suitable heat stabilizers are, for example, polyamides, amides of polybasic carboxylic acids, amidines, such as dicyano-diamide, hydrazines, ureas, poly(N-vinyllactams) and alkali earth metal salts of carboxylic acids such as calcium ricinoleate or lactate, whereas phenols, especially bisphenols, (for example bis(2-hydroxy-3 tert. butyl-5-methyl phenyl) methane and aromatic amines, are used as oxidation stabilizers. As light stabilizers there are used -hydroxy-benzophenone derivatives and derivatives of benzotriazole, these stabilizers being used in total amounts of from 0.1 to 10, preferably from 0.5 to 5 weight percent, calculated on the total mixture.

The molding composition according to the invention may be chopped or ground mechanically to granules, snips, flakes or powder. It is thermoplastically moldable and workable by the usual processing methods, such as injection molding or extrusion. It is suitable as technical material for the preparation of semi-finished articles and finished products, such as shaped articles, e.g. bars, rods, plates, films, ribbons and tubes, as well as household articles, e.g. dishes and tumblers, and machine parts of stable dimensions and measurements, e.g. cases, gear wheels, bearing parts and steering elements.

The following examples illustrate the invention.

EXAMPLES 1 to 15

A mixture consisting of 98 parts by weight of trioxane, 2 parts by weight of dioxolane and 0.2 parts by weight of methylal is maintained at a temperature of 70° C. 100 g of this mixture is fed into a flat collapsible aluminium tube having thin walls and measuring 15 cm × 6 cm × 1 cm. After having added 75 ppm of boron trifluoride-di-n-butyl etherate, which had been diluted with cyclohexane in the weight proportion of 1:80, the collapsible tube is sealed immediately and shaken vigorously for 3 seconds. Subsequently it is placed in a mixture of ice and water having a temperature of 0° C. After 3 minutes, the collapsible tube is put into a heating bath, the period and temperature being listed in the following table 1.

At the end of the polymerization period the collapsible tube is cooled to 0° C; the crude polymer is removed from the tube and ground to a fine powder, which is boiled for 30 minutes in 1 liter of methanol containing 5 ml of monoethanol-amine, subsequently vacuum filtered at room temperature, washed with methanol, and finally dried at a temperature of 70° C under nitrogen. In order to eliminate unstable portions, the dried polymer is heated to a temperature of 150° C for 30 minutes in 1.5 liters of benzyl alcohol containing 5 ml of triethanolamine. After cooling the solution, the polymer is precipitated by addition of 1 liter of methanol, subsequently vacuum filtered, washed with methanol and boiled again with 1 liter of methanol. After filtration the polymer is finally dried at a temperature of 70° C and under a pressure of 200 Torr under nitrogen, and weighed for yield control. Further details and the results of the tests in respect to certain properties are shown in table 1.

TABLE 1

| Example | RT (sec) | Poly.-Temp. | PT (min) | Loss in weight | yield (%) | RSV (dl/g) | $i_{20}$ | $i_2$ (g/10 min) | $i_{20}/i_2$ |
|---|---|---|---|---|---|---|---|---|---|
| 1 | — | 65 | 30 | 0 | 83.0 | 1.20 | 46.0 | 0.71 | 65 |
| 2 | — | 70 | 15 | 0 | 84.0 | 1.19 | 48.2 | 0.84 | 57 |
| 3 | — | 70 | 30 | 0 | 86.4 | 1.28 | 44.1 | 0.85 | 52 |
| 4 | — | 80 | 10 | 0 | 82.0 | 1.09 | 70.3 | 1.14 | 72 |
| 4 | — | 80 | 20 | 0 | 86.5 | 0.96 | 177 | 3.9 | 46 |
| 6 | — | 90 | 5 | 0 | 84.7 | 1.30 | 37.4 | 0.48 | 78 |
| 7 | — | 90 | 10 | 0 | 82.8 | 1.20 | 94.3 | 1.00 | 94 |
| 8 | — | 100 | 5 | 1 | 83.0 | 1.27 | 61 | 0.87 | 70 |
| 9 | — | 100 | 10 | 1 | 82.8 | 1.13 | 87 | 1.4 | 62 |
| 10 | — | 110 | 5 | 1 | 83.0 | 1.26 | 91.2 | 1.1 | 83 |
| 11 | — | 110 | 10 | 2 | 81.9 | 1.11 | 89.0 | 1.75 | 51 |
| 12 | — | 120 | 2.5 | 1 | 80.6 | 1.45 | 23.3 | 0.47 | 50 |
| 13 | — | 120 | 5 | 1 | 81.1 | 1.26 | 77.3 | 1.4 | 55 |
| 14 | — | 120 | 10 | 6 | 78.2 | 1.32 | 91.5 | 1.55 | 59 |
| 15 | — | 130 | 5 | 6 | 77.8 | 1.12 | 73.1 | 1.4 | 52 |
| A | 15 | 70 | 30 | 1.3 | 79.8 | 0.62 | 659 | 25.8 | 25.5 |

TABLE 1-continued

| Example | RT (sec) | Poly.-Temp. | PT (min) | Loss in weight | yield (%) | RSV (dl/g) | $i_{20}$ | $i_2$ (g/10 min) | $i_{20}/i_2$ |
|---------|----------|-------------|----------|----------------|-----------|------------|----------|------------------|--------------|
| B | 12 | 80 | 20 | 8 | 80.4 | 0.64 | 834 | 26 | 32 |
| C | 10 | 90 | 10 | 11 | 73.4 | 0.64 | 964 | 31.5 | 31 |
| D | 10 | 100 | 5 | 17 | 70.7 | 0.51 | 1287 | 48 | 27 |
| E | — | 110 | 5 | 21 | 66.5 | 0.60 | 590 | 29 | 20 |
| F | — | 120 | — | 100 | 0 | — | — | — | — |
| G | — | 130 | — | 100 | 0 | — | — | — | — |

The reduced specific viscosity (RSV) of the polymer is measured with a 0.5 wt.% solution of the polymer in γ-butyrolactone containing 2 wt.% of diphenylamine, at a temperature of 140° C. The melt indexes $i_2$ and $i_{20}$ are measured according to German Industrial Norms DIN 53735 at a temperature of 190° C and a load of 2.16 kg or 21.6 kg, respectively, after having stabilized the polymer with a mixture of 0.1 weight-% of dicyano-diamide and 0.5 wt.% of bis(2-hydroxy-3-tert.butyl-5-methyl-phenyl)-methane, each calculated on the quantity of the polymer. The melt index ratio $i_{20}/i_2$ is a measure of the variation in fluidity of the polymer as a function of pressure. The polymerization time (RT) is the heating time in a thermally constant heating bath. Loss in weight means the reduction of weight of the polymerization mixture occurring from the moment of mixing the components to the end of the polymerization time.

COMPARATIVE EXAMPLES A TO G

The comparative examples are carried out according to examples 1 to 15, with the difference however, that the collapsible tube is put into a heating bath immediately upon mixing the monomers and the catalyst solution without intermediate cooling. The polymerization mixture solidifies after a certain retardation time measured from the time of addition of the catalyst (retardation time = RT).

EXAMPLES 16 to 18

In analogy to examples 1 to 15 there are polymerized in each of these examples 98 g of trioxane and 2 g of a cyclic acetal in the presence of different quantities of boron trifluoride-di-n-butyl etherate as catalyst and in the presence of different quantities of methylal as regulator, the polymerization period lasting 10 minutes and the polymerization temperature being 90° C. The work-up of the crude polymers is performed according to the previous examples. Table 2 shows the details and results of these examples.

COMPARATIVE EXAMPLES H TO K

The comparative examples are carried out as described for examples 16 to 18, with the differences, however, as specified for the comparative examples A to G.

TABLE 2

| Example | cyclic acetal | catalyst (ppm) | regulator (ppm) | yield (%) | RSV (dl/g) |
|---------|---------------|----------------|-----------------|-----------|------------|
| 16 | 1,3-dioxane | 200 | 500 | 81.0 | 1.40 |
| 17 | 1,3-dioxepane | 125 | 3000 | 80.1 | 1.10 |
| 18 | 4-methyl-1,3-dioxolane | 200 | 500 | 57.5 | 0.67 |
| H | 1,3-dioxane | 200 | 500 | 75.2 | 0.83 |
| J | 1,3-dioxepane | 125 | 3000 | 76.0 | 0.62 |
| K | 4-methyl-1,3-dioxolane | 200 | 500 | 53.8 | 0.45 |

EXAMPLES 19 TO 21

In analogy to examples 1 to 15, there are polymerized in each of these examples 98 g of trioxane and 2 g of 1,3-dioxolane in the presence of 0.3 g of methylal as regulator using different catalysts, the polymerization period lasting 20 minutes and polymerization temperature being 80° C. The work-up of the crude polymers is performed according to the aforementioned examples. Table 3 shows the details and results of these examples.

COMPARATIVE EXAMPLES L TO N

The comparative examples are carried out as described for examples 19 to 21, with the differences, however, as specified for the comparative examples A to G.

TABLE 3

| Example | catalyst (ppm) | diluent (ppm) | RT (sec) | Loss in weight(%) | yield (%) | RSV (dl/g) |
|---------|----------------|---------------|----------|-------------------|-----------|------------|
| 19 | boron-trifluoride | nitrogen | — | 0 | 85 | 1.12 |
| 20 | triphenyl-methylhexafluorophosphate 500 | ethylene-chloride 10 000 | — | 0.5 | 82 | 0.97 |
| 21 | perchloric acid (70%) 0.5 | 1.4-dioxane 5 000 | — | 0 | 79 | 1.05 |
| L | boron-trifluoride 60 | nitrogen 600 | 15 | 6 | 78 | 0.73 |
| M | triphenyl-methyl-hexafluorophosphate 500 | ethylene-chloride 10 000 | 25 | 7.5 | 75 | 0.65 |
| N | Perchloric acid (70%) 0.5 | 1.4-dioxane 5 000 | 7 | 8 | 73 | 0.68 |

EXAMPLES 22 TO 27

In analogy to examples 1 to 15 there are polymerized different quantities of trioxane and dioxolane in the presence of 0.3 g of methylal as regulator, by means of different quantities of boron trifluoride-di-n-butyl etherate (diluted with cyclohexane in a proportion of 1:80) as catalyst, the polymerization period being 10 minutes and the polymerization temperature being 90° C. The crude polymers are worked-up according to the aforementioned examples. Table 4 shows the details and results of these examples.

COMPARATIVE EXAMPLES O TO T

The comparative examples are carried out as described for examples 22 to 27, with the differences, however, as specified for the comparative examples A to G.

TABLE 4

| Ex. | Trioxane (g) | Dioxolane (g) | catalyst (ppm) | RT (sec) | Loss in wt. % | yield (%) | RSV (dl/g) |
| --- | --- | --- | --- | --- | --- | --- | --- |
| 22 | 99.5 | 0.5 | 100 | — | 0.4 | 77.6 | 1.28 |
| 23 | 99 | 1 | 100 | — | 0.4 | 77.7 | 1.10 |
| 24 | 98 | 2 | 100 | — | 0.3 | 79.2 | 1.14 |
| 25 | 97 | 3 | 125 | — | 0.8 | 78.1 | 0.92 |
| 26 | 95 | 5 | 150 | — | 0.9 | 83.3 | 0.97 |
| 27 | 90 | 10 | 300 | — | 0.3 | 89.0 | 0.78 |
| O | 99.5 | 0.5 | 100 | 15 | 9.1 | 69.4 | 0.60 |
| P | 99 | 1 | 100 | 22 | 6.2 | 73.5 | 0.68 |
| Q | 98 | 2 | 100 | 40 | 5.2 | 73.2 | 0.52 |
| R | 97 | 3 | 125 | 42 | 8.6 | 76.9 | 0.41 |
| S | 95 | 5 | 150 | 170 | 5.5 | 75.0 | 0.54 |
| T | 90 | 10 | 300 | 25 | 7.8 | 82.4 | 0.48 |

EXAMPLE 28

A mixture of 1,3,5-trioxane and 1,3-dioxolane with methylal as regulator and boron trifluoride-di-n-butyl etherate (in a weight proportion of 1:49 diluted in anhydrous cyclohexane) as catalyst was sprayed through a one-component-nozzle onto a cooled roll having a diameter of 30cm, a working width of 50 cm and a cooling surface of about 0.5 m² turning at a speed of 6 revolutions per minute. The mixture was sprayed onto the roll through the nozzle at a temperature of 85° C and over a width of about 25 cms, the roll being maintained at a temperature of 15° C by means of an interior cooling system. The mixture solidifying on the roll was scraped off by a knife fixed alongside the roll at the level of the roll axis in such a way that the solidified mixture reached the knife after a 270° rotation of the roll. The knife and the casing of the roll system were kept at a temperature of 130° C.

The mixture scraped off the roll was received by a screw conveyor open on top and wide-pitched, placed under the roll. This screw conveyor transported the mixture to a mill through a pipe having a length of 200 cm and an inner diameter of 10 cm. The roll and the screw area were under a nitrogen atmosphere.

The half-jacket shell of the screw casing and the pipe were maintained at a temperature of from 125° to 130° C. The average residence time of the mixture in the screw area was about 5 minutes. Finally, the ground product was fed into a vessel containing 100 l of methanol containing 0.5 % by weight of monoethanolamine. The weight of the ground product was determined by differential weighing (crude polymer).

The methanolic suspension of the crude polymer was mixed with 300 l of methanol containing 0.1 wt. % of monoethanolamine, fed into an autoclave heated there for one hour up to 70° C while stirring. The crude polymer was vacuum filtered, dried under nitrogen at a temperature of 70° C in a fluidized bed dryer and weighed (crude polymer after boiling out).

The dried crude polymer was again fed into the autoclave and suspended in a mixture of 400 l of a methanol/water mixture (weight proportion 3:2) and 400 ml of triethylamine; the autoclave was flushed with nitrogen, the suspension heated up to a temperature of 150° C while stirring and maintained at this temperature for 30 minutes. After cooling slowly to room temperature the polymer was vacuum filtered, washed once with methanol and dried according to the above described method (polymer after thermal degradation).

Now, the polymer was mixed with 0.1 wt. % of dicyanodiamide and 0.5 wt. % of bis(2-hydroxy-3-tert.butyl-5-methylphenyl)-methane, each calculated on the polymer, and the thus obtained composition was graulated at a temperature of 190° C on a double screw extruder. The melt indexes $i_2$ and $i_{20}$ of the stabilized polymer were determined according to German Industrial Norms (=DIN) 53 735 at a temperature of 190° C and a load of 2.16 kg resp. 21.6 kg. The thermal stability of the stabilized polymer is defined by the loss in weight after a two hour heating under air in an oven having a temperature of 230° C.

Table 5 given below shows further details and test results.

EXAMPLE 29

Example 28 was repeated except that the conveyor screw and the polymerization pipe was replaced by a paddle screw revolving at a rate of 200 revolutions per minute and by a subsequent kneader, the screw of which had a discontinuous worm and moved back and forth (Buss kneader PR 100). The jacket temperature of the kneader was 130° C; the average residence time of the polymerizing mixture in the kneader was about 3 minutes.

Further details and test results are shown in table 5.

EXAMPLE 30

Example 29 was repeated with the modifications specified in table 5.

TABLE 5

| Example | 28 | 29 | 30 |
| --- | --- | --- | --- |
| Quantity of monomer | 53 | 50 | 50 |
| Trioxane *) *wt. %) | 98 | 98 | 95 |
| dioxolane **) (wt. %) | 2 | 2 | 5 |
| regulator **) (ppm) | 1000 | 1000 | 500 |
| catalyst solution (ppm) | 290 | 290 | 270 |
| spraying time (min) | 120 | 135 | 110 |
| crude polymer (kg) | 50.0 | 48.0 | 47.5 |
| crude polymer after boiling out (kg) | 48.5 | 45.0 | 46.0 |
| crude polymer after thermal degradation (kg) | 43.0 | 41.0 | 42.5 |
| Yield (%) | 81 | 82 | 85 |
| $i_2$ (g/10 min.) | 6.8 | 4.5 | 7.3 |
| $i_{20}$ (g/10 min.) | 590 | 255 | 430 |
| $i_{20}/i_2$ | 87 | 57 | 59 |
| loss in weight (%) | 3.2 | 2.4 | 3.7 |

*) purified by refluxing for several hours over 4,4'-diamino-dicyclohexyl-methane and calcium hydride under nitrogen and fractional distillation.

**) purified by refluxing for several hours over lithium-aluminum hydride under nitrogen and fractional distillation.

We claim:

1. In a process for producing copolymers of trioxane by copolymerization of 99.9 to 90 weight percent of trioxane and 0.1 to 10 weight percent of a cyclic acetal, which process includes the steps of mixing said trioxane and cyclic acetal with a cationically active catalyst at a temperature of 62° to 115° C., solidifying the resulting mixture by chilling it and thereafter heating the resulting mixture to about 62° to 130° C. while it is maintained in a solid state to substantially complete said polymerization, the improvement which consists in chilling the liquid mixture of trioxane and acetal immediately after it is mixed and prior to the development of turbidity therein.

2. The process according to claim 1 wherein the cyclic acetal used has the formula

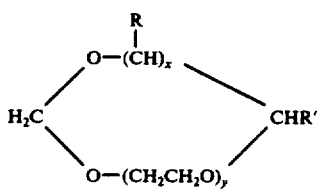

wherein R and R' may be the same or different and each represents a hydrogen atom, a phenyl radical or an aliphatic alkyl radical having from 1 to 5, preferably 1 to 3 carbon atoms, and $x$ is an integer from 1 to 7, preferably from 1 to 5, and $y$ is zero, or $x$ is 1 and $y$ is 1 to 3.

3. A process according to claim 1 wherein the mixture is cooled to a temperature of from $+40°$ C. to $-20°$ C.

4. A process according to claim 1 wherein the cooling is performed within a period from 0.1 second to 3 minutes.

5. A process according to claim 1 wherein the mixture is solidified within a period of 1 to 5 seconds..

6. In a process for producing copolymers of trioxane by copolymerization of 99.9 to 90 weight percent of trioxane and 0.1 to 10 weight percent of cyclic acetal, which process includes the steps of mixing said trioxane and cyclic acetal with a cationically active catalyst at a temperature of 62° to 115° C., solidifying the resulting mixture by chilling it and thereafter heating the resulting mixture to about 62° to 130° C. while it is maintained in a solid state to substantially complete said polymerization, the improvement which consists in applying the liquid mixture to a refrigerated roll to solidify it immediately after mixing and prior to the development of turbidity therein.

7. A process according to claim 6 wherein the cyclic acetal used has a formula

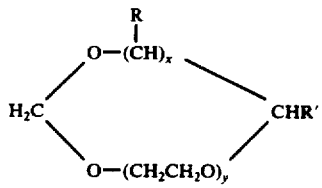

wherein R and R' may be the same or different and each represents a hydrogen atom, a phenyl radical or an aliphatic alkyl radical having from 1 to 5, preferably 1 to 3 carbon atoms, and $x$ is an integer from 1 to 7, preferably from 1 to 5, and $y$ is zero or $x$ is 1 and $y$ is 1 to 3.

8. A process according to claim 6 wherein the liquid mixture is solidified by maintaining the roll at a temperature of from $+40°$ to $-20°$ C.

9. A process according to claim 6 wherein the mixture is solidified within a period of 1 to 60 seconds.

10. A process for producing a trioxane copolymer which comprises preparing a homogeneous mixture of 99.9 to 90 weight % of trioxane, 0.1 to 10 weight % of a cyclic acetal and a cationically active catalyst at a temperature of 62° to 115° C., chilling the liquid mixture immediately after it is mixed and prior to the development of turbidity therein to a temperature of 40° to $-20°$ C. to solidify it, polymerizing the solidified mixture at a temperature of 62° to 130° C. without melting and submitting the resulting copolymer to a thermal or hydrolytic controlled partial degradation down to primary alcohol terminals.

* * * * *